(12) United States Patent
Kruszewski et al.

(10) Patent No.: US 12,411,016 B2
(45) Date of Patent: Sep. 9, 2025

(54) SYSTEMS AND METHODS FOR PROVIDING LOCATION-BASED TRAVEL OBJECTIVE NOTIFICATIONS

(71) Applicant: JPMORGAN CHASE BANK, N.A., New York, NY (US)

(72) Inventors: David Kruszewski, Media, PA (US); Simon Luthi, Landenberg, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 215 days.

(21) Appl. No.: 18/046,355

(22) Filed: Oct. 13, 2022

(65) Prior Publication Data

US 2023/0117895 A1 Apr. 20, 2023

Related U.S. Application Data

(60) Provisional application No. 63/255,758, filed on Oct. 14, 2021.

(51) Int. Cl.
*G01C 21/34* (2006.01)
*G01C 21/28* (2006.01)
*G01C 21/36* (2006.01)

(52) U.S. Cl.
CPC ........... *G01C 21/343* (2013.01); *G01C 21/28* (2013.01); *G01C 21/3676* (2013.01)

(58) Field of Classification Search
CPC ....... G01C 21/343; G01C 1/28; G01C 1/3676
See application file for complete search history.

(56) References Cited

U.S. PATENT DOCUMENTS

| | | | |
|---|---|---|---|
| 9,183,685 B2* | 11/2015 | Ricci | G07C 5/08 |
| 10,185,917 B2* | 1/2019 | Greystoke | G06Q 30/0619 |
| 11,451,870 B1* | 9/2022 | Panchaksharaiah | H04N 21/4666 |
| 2017/0161618 A1* | 6/2017 | Swaminathan | G06F 16/23 |
| 2025/0111944 A1* | 4/2025 | Alves Luz Viana | G16H 50/20 |

* cited by examiner

*Primary Examiner* — Redhwan K Mawari
(74) *Attorney, Agent, or Firm* — GREENBERG TRAURIG LLP

(57) ABSTRACT

In some aspects, the techniques described herein relate to a method including: receiving, by a collaboration service, location data of a user, wherein the location data includes a timestamp; verifying, by the collaboration service and based on a digital itinerary associated with the user, a location of the user; processing data from a data profile associated with the user as input data to a machine learning model; receiving, by the collaboration service and as output of the machine learning model, a plurality of predicted travel objective classifications; determining, by the collaboration service, a plurality of travel objectives, wherein each of the plurality of travel objectives is associated with one of the plurality of predicted travel objective classifications; determining, by the collaboration service, a travel objective within a predefined proximity of the location of the user; and displaying the travel objective to the user via a planning interface.

14 Claims, 9 Drawing Sheets

SYSTEMS AND METHODS FOR PROVIDING LOCATION-BASED TRAVEL OBJECTIVE NOTIFICATIONS

RELATED APPLICATIONS

This application claims the benefit of U.S. Provisional Patent Application Ser. No. 63/255,758, filed Oct. 14, 2021, the disclosure of which is hereby incorporated, by reference, in its entirety.

BACKGROUND

1. Field of the Invention

Embodiments generally relate to providing data and location enhanced benefits.

2. Description of the Related Art

Traditionally, people spend vacation and holiday time traveling together with groups of friends and family. Due to the limitations of conventional travel planning options, the planning, booking, payment, etc., of vacation and holiday trips tends to fall on a single member of the traveling group. Customer research shows that when using online resources for planning a vacation, a person may have up to 30 internet browser tabs open in order to coordinate itinerary items such as destination, airfare, flight schedules, hotels/lodging, etc. Such task saturation may then be exacerbated by competing information, data, wishes, wants, opinions, schedules, budgets, etc., of the planner's travel companions. This may lead to an overload of tasks for the planner; the planner becoming disillusioned with the anticipated travel, and an oversight of preferred travel arrangements for the other members of the traveling group. Additionally, conventional methods of travel planning causes missed opportunities for travel service and management providers to enhance customers' experience by leveraging information.

SUMMARY

In some aspects, the techniques described herein relate to a method, including: receiving, by a collaboration service, location data of a user, wherein the user is a user of the collaboration service, and wherein the location data includes a timestamp; verifying, by the collaboration service and based on a digital itinerary associated with the user, a location of the user; processing data from a data profile associated with the user as input data to a machine learning model; receiving, by the collaboration service and as output of the machine learning model, a plurality of predicted travel objective classifications; determining, by the collaboration service, a plurality of travel objectives, wherein each of the plurality of travel objectives is associated with one of the plurality of predicted travel objective classifications; determining, by the collaboration service, a travel objective within a predefined proximity of the location of the user; and displaying the travel objective to the user via a planning interface.

In some aspects, the techniques described herein relate to a method, wherein the location data includes GPS coordinates.

In some aspects, the techniques described herein relate to a method, wherein the digital itinerary includes a time field, and wherein the time field indicates a window of time that the user will be in a location.

In some aspects, the techniques described herein relate to a method, wherein the digital itinerary the location is included in a field that is related to the time field.

In some aspects, the techniques described herein relate to a method, wherein the travel objective includes a tracking identifier.

In some aspects, the techniques described herein relate to a method, including: receiving, by the collaboration service, the tracking identifier from a service provider of the travel objective.

In some aspects, the techniques described herein relate to a method, including: including, based on receiving the tracking identifier, the travel objective in a user profile of the user with a related indication that the travel objective was utilized by the user.

In some aspects, the techniques described herein relate to a system including one or more computer processors, wherein the one or more computer processors are configured to: receive, by a collaboration service, location data of a user, wherein the user is a user of the collaboration service, and wherein the location data includes a timestamp; verify, by the collaboration service and based on a digital itinerary associated with the user, a location of the user; process data from a data profile associated with the user as input data to a machine learning model; receive, by the collaboration service and as output of the machine learning model, a plurality of predicted travel objective classifications; determine, by the collaboration service, a plurality of travel objectives, wherein each of the plurality of travel objectives is associated with one of the plurality of predicted travel objective classifications; determine, by the collaboration service, a travel objective within a predefined proximity of the location of the user; and display the travel objective to the user via a planning interface.

In some aspects, the techniques described herein relate to a system, wherein the location data includes GPS coordinates.

In some aspects, the techniques described herein relate to a system, wherein the digital itinerary includes a time field, and wherein the time field indicates a window of time that the user will be in a location.

In some aspects, the techniques described herein relate to a system, wherein the digital itinerary the location is included in a field that is related to the time field.

In some aspects, the techniques described herein relate to a system, wherein the travel objective includes a tracking identifier.

In some aspects, the techniques described herein relate to a system, wherein the one or more computer processors are configured to receive, by the collaboration service, the tracking identifier from a service provider of the travel objective.

In some aspects, the techniques described herein relate to a system, wherein the one or more computer processors are configured to include, based on receiving the tracking identifier, the travel objective in a user profile of the user with a related indication that the travel objective was utilized by the user.

In some aspects, the techniques described herein relate to a non-transitory computer readable storage medium, including instructions stored thereon, which instructions, when read and executed by one or more computer processors, cause the one or more computer processors to perform steps including: receiving, by a collaboration service, location data of a user, wherein the user is a user of the collaboration service, and wherein the location data includes a timestamp; verifying, by the collaboration service and based on a digital itinerary associated with the user, a location of the user; processing data from a data profile associated with the user as input data to a machine learning model; receiving, by the collaboration service and as output of the machine learning model, a plurality of predicted travel objective classifications; determining, by the collaboration service, a plurality of travel objectives, wherein each of the plurality of travel objectives is associated with one of the plurality of predicted travel objective classifications; determining, by the collaboration service, a travel objective within a predefined proximity of the location of the user; and displaying the travel objective to the user via a planning interface.

In some aspects, the techniques described herein relate to a non-transitory computer readable storage medium, wherein the location data includes GPS coordinates.

In some aspects, the techniques described herein relate to a non-transitory computer readable storage medium, wherein the digital itinerary includes a time field, and wherein the time field indicates a window of time that the user will be in a location.

In some aspects, the techniques described herein relate to a non-transitory computer readable storage medium, wherein the digital itinerary the location is included in a field that is related to the time field.

In some aspects, the techniques described herein relate to a non-transitory computer readable storage medium, wherein the travel objective includes a tracking identifier.

In some aspects, the techniques described herein relate to a non-transitory computer readable storage medium, including: receiving, by the collaboration service, the tracking identifier from a service provider of the travel objective; and including, based on receiving the tracking identifier, the travel objective in a user profile of the user with a related indication that the travel objective was utilized by the user.

DETAILED DESCRIPTION

Figure 1A:
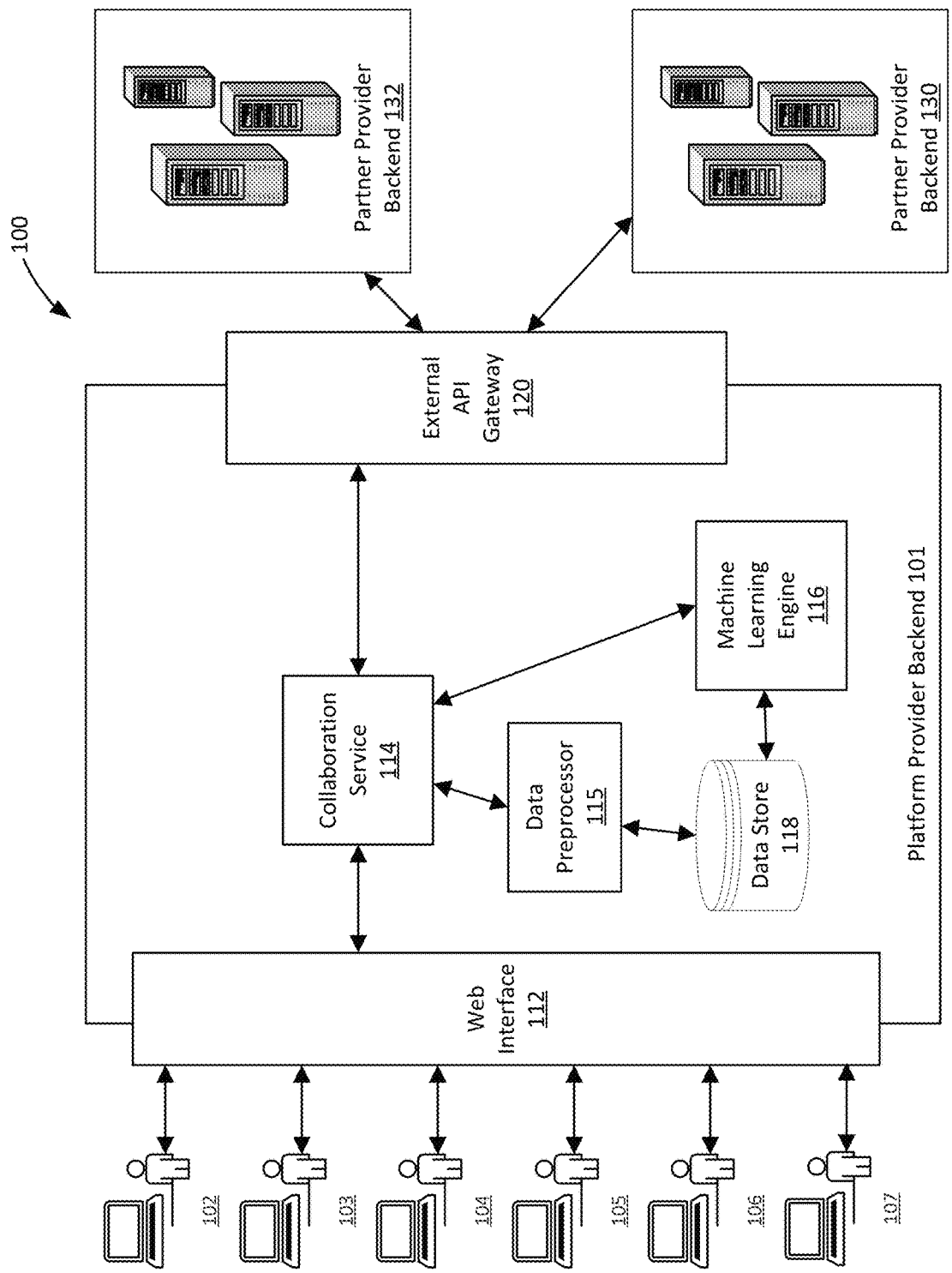
FIG. 1a is a block diagram of a collaboration system, in accordance with aspects.

Aspects are directed to enhanced travel experiences through data management.

In accordance with aspects, through the use of machine learning (ML) models trained with iterative and deep learning, and the ability to collect large amounts of data both at the individual and the group level, aspects of travel platforms described herein, including components such as planning groups, a collaboration space, user profiles, and ML models, may be used to train/prepare ML models to produce a highly inspired, relevant and appreciated travel itinerary for a group of travelers. Such a relevant and appreciated group travel itinerary is not achievable using human travel agents and/or conventional systems due to limitations on data collection and processing. Accordingly, aspects enable realization of improved travel planning and booking through big data collection paired with machine learning and other technologies, as described herein.

Travel platform, payment product, and other providers have potential access to a wealth of data about travelers. Collection and management of this data is challenging, however, not only because it is unstructured, but also because each member of a group that plans to travel together does not traditionally participate in planning a trip collaboratively. Thus, much of the potential data available to a travel platform provider goes uncollected both at the time of planning, and throughout and after the trip. Collection of such collaborative data allows a travel platform provider to make more accurate predictions about, and make highly relevant offers to, a planning group of platform users by employing artificial intelligence/machine learning (AI/ML).

Machine learning models may be trained based on users' travel information to predict what people, groups, and individuals within groups, will positively respond to. The platform may then make offers/suggestions to the travel members within a group throughout the lifecycle of the planned trip.

In accordance with aspects, a comprehensive and inclusive travel platform allows for ease of inspirational planning and collaboration among a group of travel companions through data management. A given member of the travel group may or may not be a customer of the travel platform provider. As an additional benefit to the travel platform provider, in the case where users are not originally customers, use of the platform significantly increases the chance that they will become customers of the provider.

In accordance with aspects, each platform user may have a profile stored with the platform. Existing customers of the platform, or of services affiliated with the platform, may have profiles that include data previously collected about them. For instance, a current user may have a credit card or other payment product issued by the platform or an affiliate/partner of the platform. Transactions charged to the credit card, including travel/hospitality-related transactions, may be included in, and/or associated with the existing user's profile. Previous travel booked through the platform may also be recorded as part of the existing user's profile. Additionally, information that is volunteered by the user through questionnaires, surveys, web-forms, etc., may be associated with the user's profile.

Users of the platform that are not members of the platform at the time they first access the platform, may be prompted to setup a profile before further use of the platform is made available. A questionnaire may be used to gather initial data about first-time users of the platform. Data collected from the questionnaire may be associated with the user's profile. Subsequently, input from the new users may be collected and associated with the users' respective profile or account, that is, the user's collaborative or planning group. This information may be combined with data associated with current users' accounts to form a planning group profile, where the planning group profile is based on the aggregated data associated with the profile of each individual planning group member.

Examples of user information/data collected and stored by a travel platform may include past travel history; specific travel details; a preferred airline; how many children a user has; a user's age; other travel/rewards programs that the user is a member of (e.g., flying rewards or membership programs, hotel and/or resort rewards membership programs, etc.); a number of existing reward points saved in other travel/rewards programs; food and/or restaurant preferences; hobbies; aggregate dollar amounts spent on leisure over a given time period; etc. Any past travel and leisure data that can be collected about a user may be valuable in assessing and predicting future travel and leisure that a user or related planning group of users would be interested in. As used herein, "travel service data" refers to all travel, leisure, hospitality, vacation, and other relevant data that is associated with and collected from a user, and that is aggregated to form a planning group profile for an associated planning group of users.

In accordance with aspects, a travel platform may be configured to allow multiple users to collaborate when making travel plans. Collaboration may begin with a user initiating/generating a collaboration group (also referred to herein as a planning group) from a platform interface. The planning group may include multiple users of the platform. The group may be populated through an invitation process. Upon acceptance of a received invitation, another platform user may become a part of the planning group. Both in-band and out-of-band communication channels may be used to invite users, or potential users, to join a planning group. Existing users of the platform may receive in-band invitations (e.g., an in-app prompt to join the group). Non-users may receive an invitation through other means such as via email or a SMS message, or other out-of-band communication channels. Users may also, in accordance with aspects, browse to web-based interfaces and search for a shared group identifier (ID) or the name of a planning group initiating user (i.e., an administrative-level user that initiated the planning group), or some other lookup key in order to find and join a planning group.

The initiating user may be given heightened or elevated privileges over the planning group in order to manage the group. For example, the initiating user may be given administration rights that include adding/deleting members from the group. The initiating user may also have administration privileges over other aspects of the planning group described herein and may be able to delegate administrative responsibilities to other members of the planning group.

In accordance with aspects, after a planning group is formed, trip-planning collaboration may commence. The collaboration platform may include a collaboration space, which, in turn, may include a planning interface that is accessible to all planning group members. The planning interface may provide systems for chat, and the ability to propose potential destinations, activities, restaurants, flights, hotels/lodging, etc. The planning interface may further include and display a dynamic digital itinerary that lists agreed-upon components of the travel plan. Voting may be performed for each proposed itinerary item by the planning group members. Acceptance of a proposed travel component onto the official digital itinerary for the planning group may be set as a majority of votes, a supermajority of votes (e.g., three quarters of planning group members), etc. In some aspects, an administrative user may be able to unilaterally add or remove a line-item from the digital itinerary.

In accordance with aspects, a collaboration space for facilitating group planning for travel may include and display tools needed to plan and organize a travel event for a planning group. The collaboration space may include a search function that allows group members to search for destinations, lodging, airfare, flight schedules, restaurants, activities, etc. The search function may include an internet browser, which may be a conventional or a custom internet browser. A custom browser may include functionality designed to integrate with airline, hotel, lodging, restaurant, and other travel-related systems or backends. In other aspects, the browser may be an embedded browser that is embedded into a mobile application. Integration may allow for saving, reserving, holding, booking, etc., of travel-related services at the platform provider's backend, or at the particular service provider's backend systems.

For example, a collaboration space may allow a planning group member to search for lodging at a particular destination, request a hold on lodging (e.g., "hold two hotel rooms for an hour"), send a notice to other group members, and allow other group members to view and vote for, or against, the lodging. If the lodging is accepted via voting criteria (or other criteria), then the collaboration platform may include functionality that allows the user to book the lodging (e.g., through the custom browser interface, if so equipped). Similar functionality may be incorporated for plane tickets, restaurant reservations, activity reservations, etc.

In accordance with aspects, the collaboration space may make suggestions to, and/or may rank search results provided to, planning group users based on information collected about the individual users, the collective information of the group (i.e., the planning group profile), and/or similar users or groups of users. For instance, the profile information of each user may be formatted as input for a machine learning (ML) model and may be processed by the ML model. The collective planning group profile information of the planning group may also be formatted as a unified input to a ML model. Further, any combination of collective or individual profile data may be formatted as input to a ML model. Output from the ML model may include suggestions for travel-related services. The output suggestions may be provided to the planning group users via the collaboration space as proposals, banner ads, etc., for travel destinations, activities, lodging, etc., and may be selected, saved, held, proposed, voted on, booked, etc., as described above through the collaboration space.

In accordance with aspects, data may be sourced from various systems of the platform provider and of any partner service providers. Additionally, data may be collected directly from the user. Due to the variety of systems of record outside of, and from within the platform provider system collected information may be pre-processed (e.g., normalized, categorized, deduplicated, etc.) before it is used in conjunction with ML models to derive and rank suggestions for users. To accomplish this, preprocessing systems may apply weighting and semi-supervised and unsupervised learning models such as Linear Regression, Deep Neural Networks, Logistic Regression, Decision Trees, Random Forest, etc.

In accordance with aspects, ML model processing of collected data may produce trees of ranked lists of preferences specific to a user or a group of users (e.g. airports, regions, countries, climates, destinations, art mediums, artists, venues etc.) ultimately allowing the system to make personalized, hyper-relevant and timely suggestions such as travel itinerary that would normally require extensive human collaboration/research, and time targeted adds, promotions, additional itinerary items, etc., relevant to users' location and time. For instance, a suggestion promoting a store may be sent to a user while the user is passing by that particular store at, e.g., an airport.

In accordance with aspects, input data to ML models may include three categories of data: definite information, inferred information, and contextual information. Each category may be weighted differently within a ML model so as to produce more relevant output from the model. The platform may use ML model processing, or rules-based/algorithmic processing in order to preprocess, weight, or evaluate data such as these three types of exemplary data.

Definite information may be given a heaviest relative weighting. Definite information is information that is entered by a platform user (e.g., profile elements), or that results from a user's actions (e.g., dates, locations of past bookings, etc.).

Inferred information may be given a medium relative weighting. Inferred information may be derived from definite information. For example, if a platform user has indicated, through data entry into the user's profile, that the user has children or that children will be accompanying the user on a subject vacation or outing, and/or has booked family friendly properties or locations in the past, then it may be inferred by the platform that family friendly locations or events will be relevant to the user with respect to future activities.

Contextual information may be given a lightest relative weighting. Contextual information may be derived from past user activity. For instance, a user may upload a photo with minors captioned as "family" or "children." A user may also have had frequent transactions at family related stores or may have purchased family related items.

Given the examples of the data, above, the platform may infer that a user, or planning group users, prefer(s) family friendly locations, properties, activities, etc. The platform may suggest highly relevant travel-related services based on these inferences.

Other input to a ML model may include objectives expressly provided by planning group members for the group travel. For example, planning group members may include, or vote on, particular objectives for the group travel (e.g., at least one golf outing, at least one beach day, a hiking excursion, etc.). The objectives may be recorded, shared, voted on, etc., via the collaboration space of the platform. The objectives may be weighted before input to the model. For instance, if a particular objective receives a majority of votes, it may be heavily weighted, while an objective receiving a minority of votes may be less heavily weighted. Objectives may be weighted correspondingly to popularity. Accordingly, objectives receiving the most votes may be the most heavily weighted, objectives receiving the second most votes may be weighted the second most heavily, etc.

Travel objectives may also be weighted and suggested according to the popularity of a given objective as determined by algorithmic or ML processing of profile data. That is, if through the processing of a planning group profile, it is determined that a majority of the planning group users play golf, then a golf objective may be suggested to the planning group or weighted heavily in an ML model that predicts ads/suggestions for the planning group. Additionally, travel objectives that have been expressly indicated as relevant by one or more of the planning group members may be weighted accordingly. For instance, given a group of ten planning group members, if 5 of the members (via a questionnaire, survey, etc.) indicate that a golf outing is desired, while 3 indicate that a live performance is desired, and the remaining 2 indicate that a historical tour is desired, a machine learning model may be configured to appropriately weight these classifications accordingly.

For a given ML prediction, a corresponding selection of travel objectives may be provided to the planning group for selection, voting, discussion, etc. That is, if a ML model predicts that a given planning group will want to experience a golf outing, several golf offers may be displayed to the planning group through the collaboration space. These golf objectives may be offers from partners of the platform provider. Predications may consider platform provider and partner service provider preferences to optimize value to the platform users. For example, a golf outing provided by partner service provider might be of higher value to the planning group users. These platform/partner preferred predictions may be weighted heavier than comparative, but otherwise relevant, golf outing service offers/travel objectives.

Likewise, other predicted travel objectives may be provided by a ML model and offers for various classes of predictions may be displayed to users of the collaboration space. Travel objective classifications/predictions may include such leisure activities as live performances, movies, gambling venues, golf courses, public beaches, shopping venues, restaurants, resorts, etc.

Exemplary ML models may be trained using historical travel data from existing customers of the platform, public data sources, purchased data, travel related reviews, etc. Additionally, new profile data and travel details from itineraries or profile data generated within the platform, or from outside the platform, may be used to iteratively train the ML model with new/more data. Moreover, a ML model may be trained to determine historic planning groups with similar profiles as a current planning group and make similar predictions as to travel objectives for the current planning group as were made for the historic planning group.

In accordance with aspects, as ML models have access to more of the above defined information and learn from customer validation/dismissal of platform choices (e.g., user votes for/selects the system suggested top choice), the model predictions should become more accurate and over time may simply require platform users acceptance of a suggested digital itinerary.

FIG. 1a is a block diagram of a collaboration system, in accordance with aspects. System 100 includes platform provider backend 101, web interface 112, collaboration service 114, data preprocessor 115, machine learning engine 116, data store 118, and external API gateway 120. Also depicted are user devices 102-107, partner provider backend 130 and partner provider backend 132.

In accordance with aspects, platform provider backend 101 represents the backend technology infrastructure of a travel collaboration platform provider (also referred to as a travel platform provider). Partner provider backend 130 and partner provider backend 132 represent the backend technology infrastructures of organizations that partner with a travel platform provider. For instance, partner provider backend 130 and partner provider backend 132 may be the backend technology infrastructures of an airline company, a lodging (e.g., hotel chain) company, a dining/restaurant company, etc. These infrastructures include servers, computers, software applications, computer network mediums, and computer networking hardware and software for providing electronic services based on computer software applications executing on requisite hardware. Exemplary hardware and software include webservers, application servers, communication servers such as email servers and SMS servers, network routers, switches and firewalls, customdeveloped software applications (including hardware to execute such applications on), etc.

In accordance with aspects, platform provider backend 101, partner provider backend 130, and partner provider backend 132 may each include a respective private network that facilitates operative communication among system components included therein. Additionally, these backend infrastructures may be configured to interface with a public network in order to facilitate communications with hardware and software components, and other backend infrastructures that are outside of each respective backend infrastructure. Such a public network may be e.g., the Internet.

Components of platform provider backend 101, partner provider backend 130, and partner provider backend 132, and each of user devices 102-107 may be communicatively coupled to public and private networks with appropriate hardware and software at the network layer. For instance, user devices 102-107 may include a wired or wireless network interface card (NIC) that interfaces with a public network, such as the internet, and is configured with appropriate communication protocols. Likewise, components of platform provider backend 101, partner provider backend 130, and partner provider backend 132 may include hardware (NICs, switches, routers, etc.) configured with appropriate protocols for intercommunication across a public network.

At the application layer, the various components of FIG. 1a may be configured to communicate via any suitable method. For instance, communication may be configured via various application programming interfaces (APIs). APIs may be internal APIs (i.e., only accessible within the bounds of a private communication network), or they may be external facing APIs. External API gateway 120 may be a partner API that requires access rights from the providing party (e.g., platform provider backend 101) in order to gain access and facilitate operative communication. External API gateway 120 may be accessible to partner organizations, such as partner provider backend 130, and partner provider backend 132, via a public network such as the Internet. Partner provider backend 130 and partner provider backend 132 may communicate with collaboration service 114 via API calls to External API gateway 120. APIs, whether internal or external, may be based on any suitable API architecture. Exemplary API architectures and/or protocols include SOAP (Simple Object Access Protocol), XML-RPC, REST (Representational State Transfer), or the like.

In accordance with aspects, and with continued to reference to FIG. 1a, user devices 102-107 may be mobile devices, laptop computers, desktop computers, or any suitable electronic device for accessing web-based content. User devices 102-107 may store and execute web browser applications for browsing to web interface 112. Alternatively, or additionally, user devices 102-107 may store and execute a custom application (e.g., a mobile application) provided by a travel collaboration platform provider that interfaces with platform provider backend 101 and is configured to provide operative communication with platform provider backend 101 via web interface 112. In accordance with aspects, web interface 112 may be a public facing website that is hosted by a web server included in platform provider backend 101. In other aspects, web interface 112 may be an API with publicly exposed methods hosted by a web server, or API server included in platform provider backend 101.

While FIG. 1a depicts user devices 102-107, it is contemplated that system 100 may support a large number of user devices in operative communication with platform provider backend 101 via web interface 112. Accordingly, user devices 102-107 are not mean to be limiting as to the number of devices that may access platform provider backend 101 but are merely representative of a number of devices used by planning group users who wish to collaboratively plan using platform provider backend 101 and the components thereof.

In accordance with aspects, collaboration service 114 may be communicatively coupled to web interface 112 and may receive incoming electronic transmissions from user devices of users associated with a planning group. Collaboration service 114 may host a collaboration space server application (a "collaboration space"). The collaboration space may be accessible via a planning interface. The planning interface may be accessed by client devices (e.g., user devices 102-107) via a web browser or a client application (e.g., a mobile application) that is configured to be communicatively coupled to collaboration service 114 via web interface 112. The collaboration space may be centrally accessible to all members of a planning group via a public network such as the internet. The collaboration space may be a server-based application hosted by an application server included in platform provider backend 101.

In accordance with aspects, collaboration service 114 may be communicatively coupled to data store 118. Data store 118 may be any suitable data store and may represent multiple data stores housed in platform provider backend 101. In some aspects, data store 118 may be an enterprise data warehouse that aggregates data from different sources and makes the data available for data analysis, data mining, and artificial intelligence (AI) and machine learning (ML) operations. A data warehouse may include a server that performs extract, transform, and load (ETL), or extract, load, and transform (ELT) operations on data received from multiple sources. The ELT and/or ETL operations may include preparatory operations such as cleaning, standardizing, normalizing, and/or other data operations. A data warehouse may persist received data to a relational database, an online analytical processing (OLAP) database, or another appropriate type of database. The data warehouse may also include a user interface, reporting tools, and/or published private or public application programming interfaces (APIs) for programmatic submission and retrieval of data stored therein. In some aspects, data store 118 may alternatively, or additionally, be a relational database, a data lake, or any other suitable data store.

Data store 118 may be communicatively coupled to collaboration service 114 and may receive create, read, update, and/or delete commands from collaboration service 114. For example, data store 118 may store the user profiles of each member of a particular planning group. Additionally, data store 118 may store an aggregated planning group profile that is generated by combining profile data from each individual member of a planning group.

In accordance with aspects, machine learning engine 116 may be in operative communication with collaboration service 114, data preprocessor 115 (not shown), and data store 118. Machine learning engine 116 may include a machine learning model, a training service, a variable aggregator service, and other component services for training and tuning a machine learning model, and for generating predictions for a given data set using a machine learning model.

In accordance with aspects, respective users of user devices 102-107 may comprise members of a planning group. One of the respective users, e.g., the user of user device 102, may be the initiating user of the planning group. The user of user device 102 may be a current customer of a travel platform provider that provides platform provider backend 101. The travel collaboration platform provider may also provide other goods and services, such as payment services, payment products (e.g., credit cards and/or credit accounts), etc. The user of user device 102 may have an existing profile stored on data store 118. The user of user device 102 may interact with a planning interface displayed on user device 102 to generate a collaboration space. The collaboration space may be associated with the user profile of the user of user device 102, which may be stored in data store 118. As the initial requestor of the collaboration space, the user associated with user device 102 may be labeled as the initiating user by collaboration service 114.

The initiating user may send in-band or out-of-band invitation communications to fellow travel collaborators. For instance, the user of user device 102 may send invitations to the initiated collaboration space to the respective users of user devices 103-107. The users of user devices 103-107 may respond via an instance of a planning interface displayed on the users' respective devices. Some of these users may be current customers of the travel platform provider and may have existing user profiles stored at data store 118. Other of these users may not be current customers of the travel collaboration platform provider and may be prompted to setup a user profile by collaboration service 114.

The user profile of each planning group user of a collaboration space may be associated with the collaboration space. A planning group profile may be created and stored in data store 118. The planning group profile may interrelate each planning group member's profile with a lookup key, such that collaboration service 114 and machine learning engine 116 may query, access, process, etc., the aggregated profile data of all of the members of a given planning group associated with a collaboration space.

In accordance with aspects, any data associated with platform users, and accessible to the platform may be stored in data store 118 and used as input to machine learning engine 116. Because data and data sets may be captured in disparate formats, configurations, compilations, etc., data may be pre-processed (e.g., normalized, categorized, deduplicated, etc.) before it is stored in data store 118 and used as input to machine learning engine 116 to derive and rank predictions for platform users. To accomplish this, data preprocessor 115 may apply weighting and semi-supervised and unsupervised learning models such as Linear Regression, Deep Neural Networks, Logistic Regression, Decision Trees, Random Forest, etc., that appropriately format, compile, vectorize, and otherwise normalize data before storage in data store 118 and input to machine learning engine 116. Data preprocessor 115 may receive and normalize data, directly or indirectly (e.g., via collaboration service 114), from any relevant system of record of platform provider backend 101, a partner provider, or any other source as necessary or desired.

In accordance with aspects, data from user profiles, planning group profiles, systems of record, transaction systems, partner systems, and anywhere data associated with a user of planning group can be accessed, may be exposed to, and processed by, a machine learning model as input features. Given an input feature, a machine learning model may generate a prediction—that is, a recommendation or suggestion—based on the input. A ML model may be trained on historic data sets. Historic data sets can be data sets that are relevant to the input features. For example, if a model will be used to predict relevant offers based on current travel service data, then historic travel service data sets can be used to train the model. Training of a decision tree model may learn an optimal splitting of variables included in input features based on historic training data in order to form a trained model tree with which to evaluate input features and generate accurate predictions given current travel service data set as an input feature.

In accordance with aspects, variables of input feature datasets may represent nodes in a model's trees. Variables may be aggregated from historic input feature data sets and used to build the model and its trees. Many variables (in some cases, thousands) can be considered and utilized in model development. Model variables can include conditions (i.e., decisions, or questions, that must be answered as a tree is traversed), based on a training travel service dataset. The model maps the numerous variables of a current input feature dataset to an aggregated and weighted outcome (i.e., a classification, or "prediction") based on the "decisions" with respect to each variable in a tree. Model variables and conditions associated therewith route model input to a leaf node, which resides at the end of a tree.

A string of variables is, collectively, a tree, and a tree may be further divided into tree splits. The model may build thousands of trees based on the aggregated variables. At the end of a tree is a leaf node that ultimately classifies the input feature. The classification may be the model's "prediction" for a given input feature. For a group of input features (e.g., a similar input feature for each group member of a planning group) the model may end with several different predictions. The model may be configured to average the predictions for several input feature datasets in order to produce a single prediction for the planning group. Moreover, different trees may be weighted according to different criteria in order to produce a weighted average, which makes classification in a certain leaf node by the model more relevant to the outcome. A resultant weighted average may be the basis for a suggestion, ad, etc., that is presented to a planning group via a collaboration space.

Figure 2:
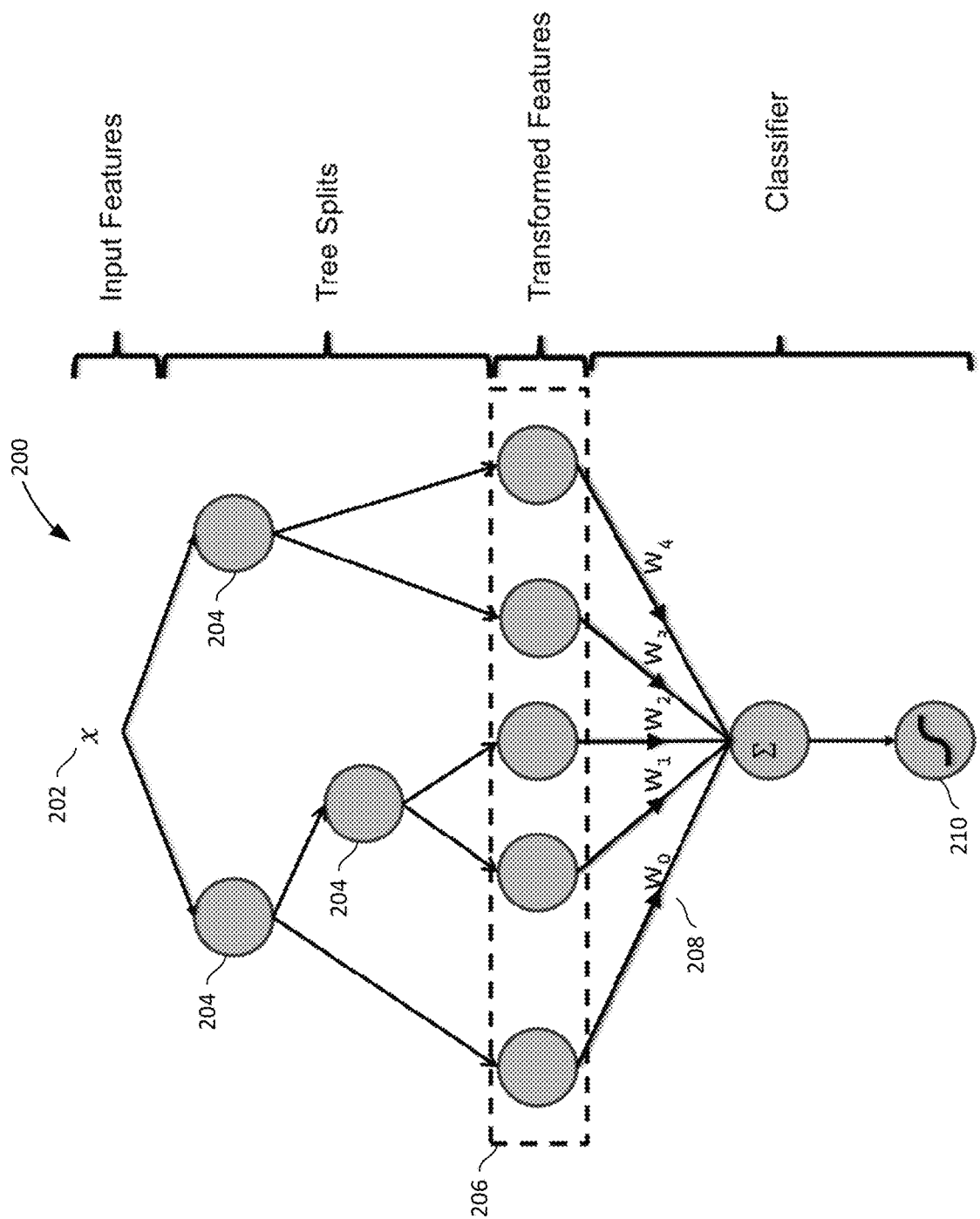
FIG. 2 is a is a diagram of a model tree, in accordance with aspects.

FIG. 2 is a is a diagram of a model tree, in accordance with aspects. Model tree 200 is an exemplary ML model tree that may be trained and used in a machine learning engine for making ML predictions. Model tree 200 includes input features 202. Input features 202 represent an input data set. Exemplary model input data may include travel service data from a user profile or a planning group profile. Variables 204 are conditions related to input features. Variables 204 represent conditions relevant to the input feature dataset. For example, a model trained to produce an activity travel objective suggestion may include variables such as "budget," and "interests," and may include conditions related to these variables such as ">$1000" and "outdoors," respectively. Input feature 202 can be routed based on conditions through tree splits of variables 204 to a leaf variable.

Leaf variables 206 are the end of a given tree, and result in a classification of the input feature. For instance, if a given input features dataset (e.g., a profile of a planning group user) includes a budget attribute of $1500, and a binary indicator that an outdoor activity is preferred over an indoor activity, then the model may result in a "classification" of "golf." That is to say that the model may predict that the user whose profile was processed as input features would like to play golf. Of course, many other variables may be part of a decision tree of a model. Moreover, certain trees may be weighted more heavily that other trees. Weights 208 represent a weight given to each tree. A classifier may consider the weight assigned to each tree when making a prediction for several input feature datasets. Prediction 210 represents the ultimate prediction of the model 200 for a given set of input feature dataset. Prediction 210 may be a weighted average of each classification outcome.

Figure 3:
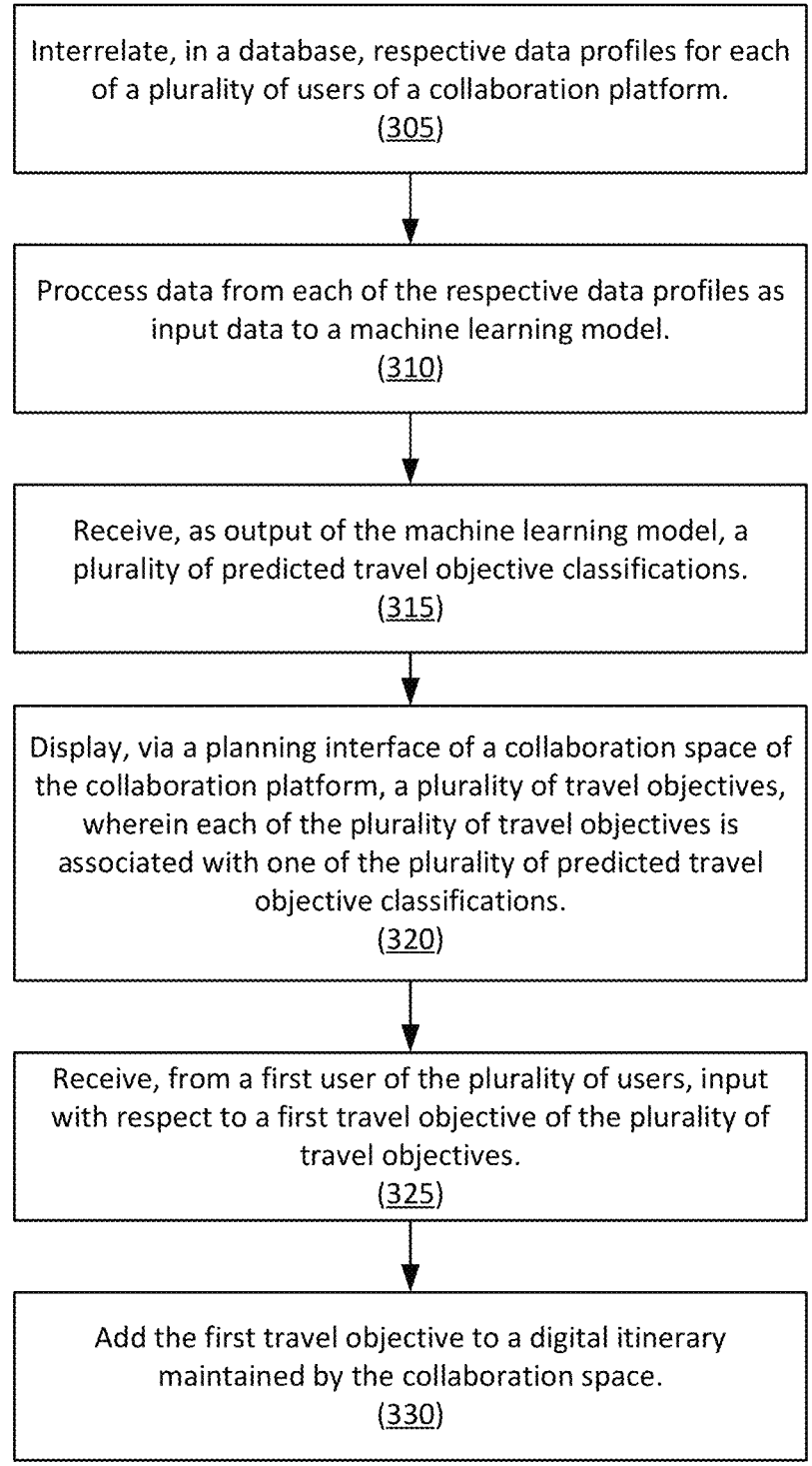
FIG. 3 is a logical flow for providing data-enhanced collaboration for group planning, in accordance with aspects.

FIG. 3 is a logical flow for providing data-enhanced collaboration for group planning, in accordance with aspects.

Step 305 includes interrelating, in a database, respective data profiles for each of a plurality of users of a collaboration platform.

Step 310 includes processing data from each of the respective data profiles as input data to a machine learning model.

Step 315 includes receiving, as output of the machine learning model, a plurality of predicted travel objective classifications.

Step 320 includes displaying, via a planning interface of a collaboration space of the collaboration platform, a plurality of travel objectives, wherein each of the plurality of travel objectives is associated with one of the plurality of predicted travel objective classifications.

Step 325 includes receiving, from a first user of the plurality of users, input with respect to a first travel objective of the plurality of travel objectives.

Step 330 includes adding the first travel objective to a digital itinerary maintained by the collaboration space.

In accordance with aspects, continued collaboration by the planning group users using the collaboration space of the platform may generate a single finalized digital travel itinerary for the planning group members. A planning group member may provide/perform any needed booking, reservation, payment, etc., of travel activities or services, e.g., through the collaboration space of the platform. This may be accomplished, e.g., via partner providers having technology backends in operative communication with a collaboration service of the platform provider.

Planning group members, whether long-time or first-time users of the platform, may be members of travel-related organizations (including the subject platform provider's organization) that provide "points" or other types of tokens to users/customers as a form of currency. Such point currencies (also referred to herein as "points") are commonly awarded to customers of the granting organizations as rewards for purchases made through and/or with the organizations. These point currencies are commonly referred to as "reward" points, or "loyalty" points.

Received points may generally be "spent" on (i.e., credited against the price of) goods and services provided through the granting organization. The goods and services may be provided by the granting organization or by a third party. For example, an airline customer may use a credit card affiliated with the airline and may be granted points for using the credit card. The points may then be used as a credit against plane tickets provided by the airline, or other goods or services provided by third parties in affiliation with the airline. Reward points systems are commonly granted by travel-related organizations for transactions booked, purchased, etc., through the respective organization. Planning group members may wish to apply these accumulated reward points as a form of credit against the cost of the travel services booked according to the final digital itinerary.

In accordance with aspects, a travel platform provider may provide a reward/loyalty point pool that allows travel group members to contribute disparate travel points to a common group points pool (or account), from which the final digital itinerary can be fully or partially funded.

The points pool may allow disparate point values/currencies to be converted into a common or unified point currency (also referred to herein as "unified points"). The points pool may be associated with the planning group and may be exclusive to the planning group members. It may, for example be generated at creation of the planning group or the collaboration space and may be accessible, configurable, and/or editable from the collaboration space. The points pool maybe generated by the initiating user, or there may be a points pool included with by default with each instance of a collaboration space. For instance, a point pool may be a group level account that is credited by the planning group members with points from disparate travel organizations/vendors and of disparate values. The travel platform may convert the contributed points into a unified-value point currency (i.e., into unified points).

In accordance with aspects, the collaboration space may include, or provide, a point conversion interface for transferring points from other travel-related organizations to a points pool of the travel platform. The collaboration space may facilitate interfacing with a third-party point issuer's public interface and/or point-storage system. The third-party point issuer may be a partner provider. The collaboration space may further facilitate determining a number of points associated with a planning group member's third-party points account, converting the reward points according to a set of conversion equations to a number of unified points and crediting the loyalty points pool with the number of unified reward points.

The point conversion interface may allow for a planning group member to provide login credentials to the third-party point issuer's point storage system. After authentication to the third-party system, the point conversion interface may use, e.g., an application programming interface (API) to interact, programmatically, with the third-party system. For instance, there may be methods exposed by the API to retrieve a number and or a type of points reflected in the third-party system as associated with the planning group member. There may also be methods/functionality that the point conversion interface may utilize to debit or deduct a specified number of points from the third-party point ledger system.

A point conversion API may expose/provide various methods. For example, an identification/authorization method may be provided to authenticate platform users using platform identification parameters and parameters registered with partner providers. Such a method may trigger a partner provider's validation scheme. The method may trigger sending of an SMS including a code (e.g., a one-time password) to a user's phone number. Methods may return a total number of available points and/or other membership details (e.g. membership status level), a terms and conditions acceptance, etc. Methods may also include a transfer method that includes a group ID of the relevant planning group, a number of points to be transferred, spending rules (can points be used for general purpose or partner products only, or specified types of products), etc. Such a method may invoke conversion rates predetermined with partner (e.g. this could be one rate for all spend types, or dedicated rates for different spend types or groups of types).

In accordance with aspects, the number of points transferred from the third-party point provider's system may be converted into unified points according to a set of conversion equations. Conversion logic may be based on predetermined (i.e., with the relevant partner provider) conversion rules and rates stored by the platform or retrieved from partner in real time. Rules may include a singular conversion rate regardless of the future spend of the converted mount, or may be more complex, including many rates associated with rules determining how the converted points could be spent at using specific rates (e.g., a hotel partner may allow a better rate if points will be spent on their property but a less favorable rate for all other hotels, and even less favorable for flights and/or other spends). The set of conversion equations may be stored as tables, executable code, etc., and may be accessible to the platform. The conversion equations may be based on negotiations between the travel platform provider and third-party point providers. For example, the platform provider may agree to reimburse the third-party point provider an amount, or a fractional amount, of fiat currency (e.g., U.S. dollars) for each point converted to a unified point.

Payment of the negotiated rate for conversion of points by the platform provider to the third-party point provider may happen immediately through available payment channels, or conversion amounts may be recorded and invoiced on a periodic basis.

In accordance with aspects, converted third-party points (unified points) may be contributed to the points pool. The unified points may be represented as data and stored in a datastore accessible by the platform. Points contributed to the points pool may include an association with the contributing planning group member. Additionally, contributed points may have an association with the points pool and/or the collaboration space initiated by the planning group.

Unified points may be stored digitally (e.g., in a relational database) as an integer value if fractional points are not awarded, as a floating-point decimal or double if fractional values are desired, or as any other primitive or reference data type as necessary or desirable. The unified point representations may be stored with a relationship pointer to the contributing planning-group user and/or to the points pool or collaboration space to which the planning-group member contributed the points. Additional relationship pointers may reference associated conversion rules, and the original issuing organization or partner provider.

In accordance with aspects, points can be donated and applied to travel objections included on the digital itinerary for the planning group in unequal portions. E.g., a first group member may contribute 100,000 points while a second group member may contribute 10,000 points. Given a unified point value system, a fiat monetary-equivalent value may be applied to donated points, and this monetary equivalent may be deducted from the donator's balance owed for the planned travel. For example, if a point value of $0.01 US dollars is assigned to each unified point, then the first group member (i.e., the donator of 100,000 points) may be credited $1000 US dollars towards their share of the balance owed for the planned trip. Likewise, the second group member may be credited ($100 US dollars).

In accordance with aspects, if a particular planning group member donates enough unified points to the relevant points pool that the first user has a credit balance in a fiat currency (e.g., US dollars) after application to their balance due for the planned travel, the points may be applied to another planning group member's balance. The points may be applied at the first member's discretion, e.g., arbitrarily or equationally (e.g., evenly across all travel companions' balance due). The travel companions that have received credit to their balance owed may then use a fund-transferring method made available through the platform to reimburse the first user for the donated points. In aspects, the platform may inform the travel companions that have received a credit from the first user of the amount of the credit and prompt them to reimburse the first user via the fund-transferring method.

In accordance with aspects, the platform may facilitate application of some third-party points without conversion to unified points. For example, the platform may match disparate third-party points to items they apply to on the itinerary.

In accordance with aspects, data indicating the types of third-party points being converted to unified points by planning group members may be used in conjunction with machine learning models (as discussed, above). Third party points data may be used as training data for ML models and may also be used as input data to ML models for achieving output predictions of travel objectives that a relevant platform user may be interested in. For example, ML output based on points input data may be used to provide ads/suggestions in the collaboration space interface to planning group members when collaborating on a travel itinerary.

In accordance with aspects, the user profile of a contributing user of unified points may store, as travel service data, a number of third-party points that have been converted into unified points. The stored number of third-party points may be indicative of travel preferences of the contributing user and may be used as a weighting factor in a ML model. For example, a number of third-party points from an air travel provider may indicate a preferred airline of the contributing user. In another example, a number of third-party points from a dining provider may indicate a restaurant that the contributing user prefers. Classifications of a ML model whose corresponding trees have variables and conditions that indicate a user profile (used as an input dataset) includes third-party points, and that include the origin of the third-party points (e.g., the particular air travel provider or dining provider) may be weighted with a relatively higher weight. Accordingly, all other outcomes being equal, the corresponding user may receive, as output of the ML model, predictions of travel objectives provided by the third-party point provider.

Figure 1B:
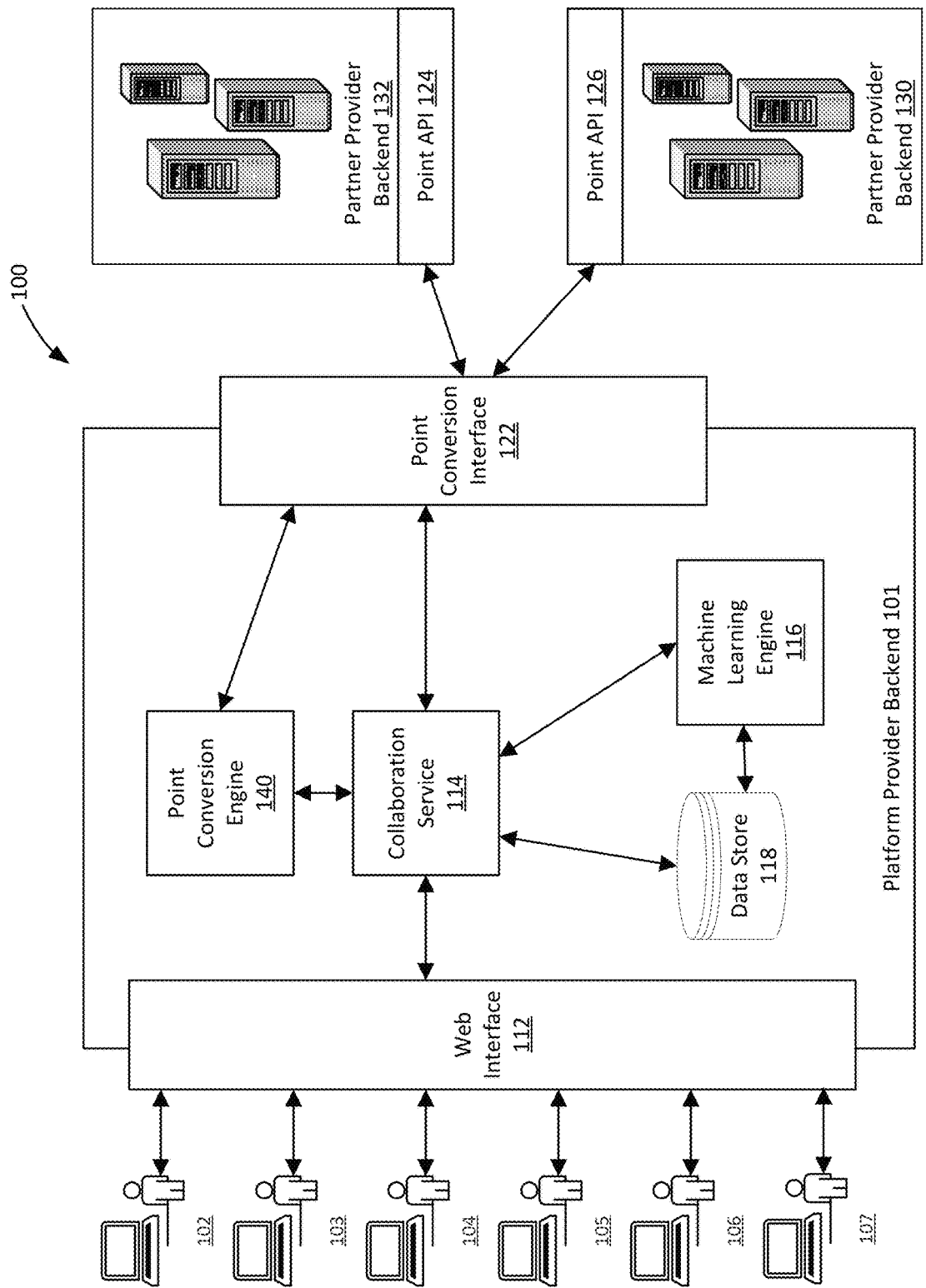
FIG. 1b is a block diagram of a collaboration system, in accordance with aspects.

FIG. 1b is a block diagram of a collaboration system, in accordance with aspects. FIG. 1b includes point conversion interface 122, point API 124, point API 126, and point conversion engine 140. Point conversion interface 122 may be accessible to planning group users via collaboration service 114. Point conversion interface 122 may communicate with partner providers via public API provided by the partner providers. Point API 124 may be a public or partner API that provides access, via point conversion interface 122 to a contributing user's third-party point balance, where the third-party points are issued by partner provider backend 132. Likewise, point API 126 may be a public or partner API that provides access, via point conversion interface 122 to a contributing user's third-party point balance, where the third-party points are issued by partner provider backend 130.

In accordance with aspects, point conversion interface 122 may facilitate parameterized method calls to methods exposed by point API 124 and point API 126. For example, point API 124 and/or point API 126 may expose an authentication method that takes a username and a password parameter of a user of partner provider backend 132 or partner provider backend 130, respectively. Point conversion interface 122 may prompt a contributing user for a username and password and pass the username and password as parameters of the authentication method, and the authentication method may return an indication of login success or failure to point conversion interface 122.

Other exemplary methods may include a get-balance method that takes a key identifier of a point account as a parameter and returns a balance of the account associated with the key identifier. An exemplary key identifier may be a username or account number. Another exemplary method may be a transfer-funds method that takes an integer or other data type that indicates a number of points to transfer to platform provider backend 101.

In accordance with aspects, point conversion engine 140 may receive third-party points from point conversion interface 122 and convert them to unified points. Point conversion engine 140 may include conversion table that include conversion equations for different third-party points. The table may include a lookup key, and incoming point-conversion requests may include the lookup key, which identifies the appropriate conversion rule. The conversion rules may include a conversion factor, and the third-party points may be multiplied by the conversion factor in order to calculate an appropriate number of unified points with which to credit a points pool. The conversion rules may be updated periodically based on agreements between the platform provider and partner providers that issue third-party points.

The converted points may then be stored as unified points in data store 118. The converted points may be stored with a relation or association to the user profile of the contributing user and to the collaboration space from which the third-party points were converted. The unified points may be displayed via the planning interface in a unified points pool for the collaboration space. A unified points pool may include points aggregated from all contributing users of the collaboration space. In some aspects, the unified points pool may also display the number of unified points contributed by each respective contributing user.

Data store 118 may further be configured to store the origin and number of third-party points in an associated user's profile. Accordingly, the number and/or origin of the third-party points may be made available as input to machine learning engine 116 as input feature data and classification weighting considerations.

Figure 8:
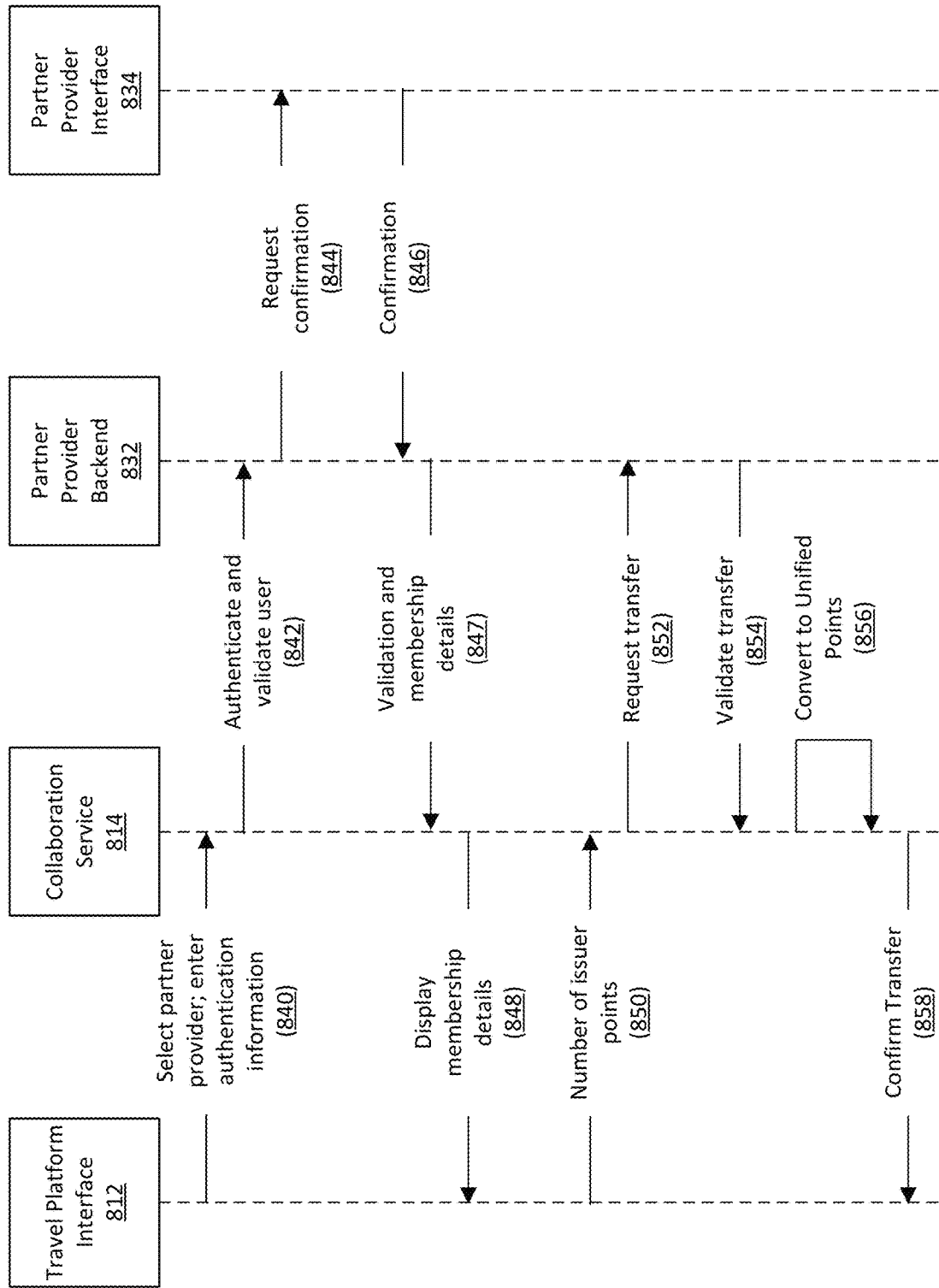
FIG. 8 is a sequence diagram for point currency conversion, in accordance with aspects.

FIG. 8 is a sequence diagram for point currency conversion, in accordance with aspects. FIG. 8 includes travel platform interface 812, collaboration service 814, partner provider backend 832, and partner provider interface 834.

With continued reference to FIG. 8, at step 840, a platform user may select a partner provider and enter authentication information for the selected partner provider. Travel platform interface 812 may pass the selected partner provider and the received authentication information to collaboration service 814 at step 842. At step 844, collaboration service 814 may pass the authentication information to partner provider backend 832 and may request authentication via an authentication method of a partner API. At step 844, partner provider backend 832 may request confirmation of the authentication from the platform user via partner provider interface 834. Partner provider interface 834 may be an in-band communication channel, such as a mobile application of the partner provider. Alternatively, partner provider interface 834 may be an out-of-band communication channel such as an email message, SMS message, etc. The user may receive the communication and respond with a confirmation of the requested authentication at step 846.

Continuing with step 847 of FIG. 8, partner provider backend 832 may send validation and membership details for the user to collaboration service 814. Collaboration service 814 may, in turn, display the received membership details at travel platform interface 812 for the user to view at step 848. Membership details may include a number of available issuer points. At step 850, the user may input a number of issuer points to be converted into unified points. At step 852, collaboration service 814 may request a transfer from partner provider backend 832 of the number of issuer points. This may be via, e.g., an API method call. At step 854, partner provider backend 832 may respond to collaboration service 814 with a return communication validating the transfer. Partner provider backend 832 may perform processing to debit the number of points indicated for conversion on its systems of record. At step 856, collaboration service 814 may execute one or more conversion methods/algorithms as discussed in more detail, herein. Once the points have been converted according to applicable conversion rules, collaboration service 814 may respond with a conversion confirmation to travel platform interface 812 at step 858.

Figure 4:
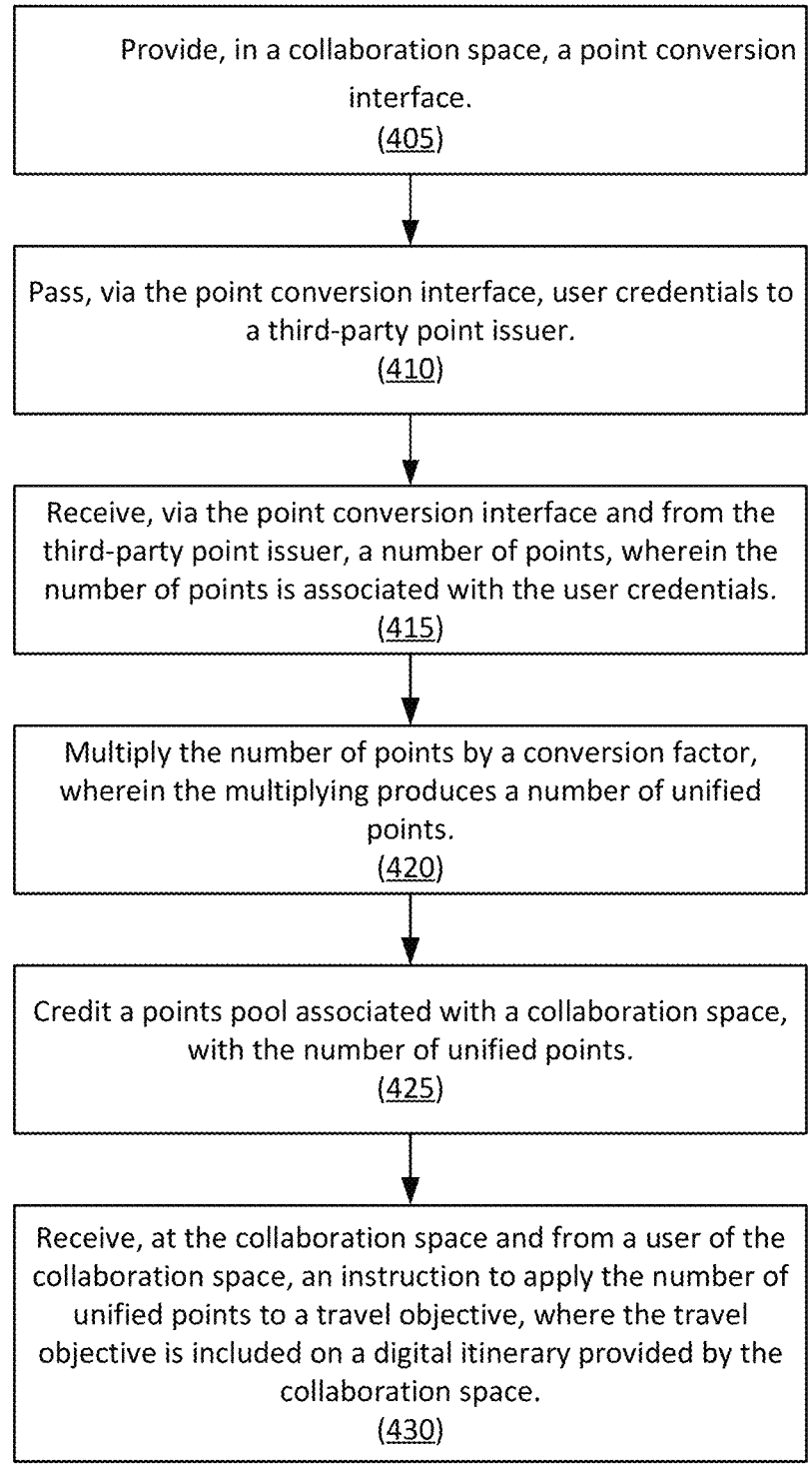
FIG. 4 is a is a logical flow for providing pooling of disparate point currencies, in accordance with aspects.

FIG. 4 is a is a logical flow for providing pooling of disparate point currencies, in accordance with aspects.

Step 405 incudes providing, in a collaboration space, a point conversion interface.

Step 410 includes passing, via the point conversion interface, user credentials to a third-party point issuer.

Step 415 includes receiving, via the point conversion interface and from the third-party point issuer, a number of points, wherein the number of points is associated with the user credentials.

Step 420 includes multiplying the number of points by a conversion factor, wherein the multiplying produces a number of unified points.

Step 425 includes crediting a points pool associated with a collaboration space, with the number of unified points.

Step 430 includes receiving, at the collaboration space and from a user of the collaboration space, an instruction to apply the number of unified points to a travel objective, where the travel objective is included on a digital itinerary provided by the collaboration space.

In accordance with aspects, and as described above, planning group members may collaborate on travel plans via a collaboration space of a travel platform, they may finalize a digital itinerary, and they may book and pay for the travel services listed on the itinerary through functionality provided by the collaboration space. Planning group members may then embark on the planned travel in accordance with the finalized itinerary. In accordance with aspects, a travel platform may provide location-based benefits in the form of ads, offers, etc., based on a user's location as indicated by the finalized itinerary in conjunction with a user's linked device, such as a mobile device, smart watch, etc.

In accordance with aspects, a finalized digital itinerary may be used by a collaboration service of a travel platform to predict a user's location at a particular date and even at a particular time. For instance, a platform may have access to a digital itinerary that indicates that a user will be flying out of a particular airport on a particular date and at a particular time, will be laid over at a second airport on the same date starting at a particular time and ending at another time and will be arriving in a third airport/city on the same date at yet another time.

In accordance with aspects, the platform interface may prompt a user to give the platform access to location services of the user's device. This may be done, e.g., through a mobile device application provided by the platform provider and executing on the planning group user's mobile device (e.g., user device 102 as shown in FIG. 1). In other aspects, location reporting services may be enabled through a mobile web browser. A location report received from a user device may include the user's location presented in GPS coordinate data, and a timestamp of the recorded location. A collaboration service may request the location report including location data, and the device may respond with the location data in near-real time. Accordingly, location data may represent an accurate location of the user device and, presumably, the user of the device as well.

In accordance with aspects, a GPS tracked location of the user's mobile device may be used by a collaboration service to determine the user's location. Moreover, a digital itinerary finalized for the planning group by the collaboration service may be used by the collaboration service in conjunction with the user's provided GPS location to provide additional context and precision with respect to the user's GPS location. The collaboration service may use a timestamp included with the received location data, or may use a current system time, as a lookup key when querying or parsing a digital itinerary associated with the user of the location-reporting device. The collaboration service may use a determined time to parse a time window field or column of a digital itinerary for a match, an approximate match, or inclusion in the time window of the determined time. The collaboration service may then cross-reference a related field of the digital itinerary to determine a corresponding location on the digital itinerary. This corresponding location may then be verified using the received location data from the user's mobile device to determine 1) that the user in the general vicinity of the corresponding location from the digital itinerary, and 2) to further determine a precise location of the user based on, e.g., the report GPS coordinates received from the mobile device.

As noted above, profile data of each planning group member (individually and/or collectively) may be processed by a ML model and the output may be predictions of travel related goods and/or services that will appeal to an individual user or to the collective planning group (alternately referred to herein as service offers, travel-related services and/or travel objectives). Exemplary travel objectives include any consumable good or service offered by a vendor, merchant, organization, etc. For example, goods such as food, beverages, clothing, toys, trinkets, electronics, household items, etc., and services such as restaurants, bars, movie theatres, shoe shining, massages, concerts, sporting events, etc.

In accordance with aspects, a travel platform may determine that a user will be in a location on a particular date and at a particular time. The platform may further determine a travel objective offered by a vendor in or near the particular place that the user will be and during the particular time that the user will be there. The platform may electronically present to the user, in the form of an advertisement, offer, etc., and via the planning interface of a collaboration space provided by a collaboration service, the travel objective. The travel objective may be highly appealing to the user and the user may not have otherwise been aware of the travel objective but for the presentation of the service offer by the platform.

In an exemplary scenario, a machine learning model may predict (based on previous transaction data, previous location and travel data, etc., associated with a platform user's profile) that consuming a beverage during a layover at an airport will be highly appealing to the user. The platform may have data (e.g., from a digital itinerary created within the platform) indicating that the user will be laid over in an airport at the same time a restaurant in the airport is offering discounts on beverages (i.e., a service offer from the restaurant's perspective, and a travel objective from the platform user's perspective). Moreover, the travel platform may receive location data from user's mobile device indicating that the user is within a predefined proximate area of the restaurant. Accordingly, the platform may present to the user the service offer of the restaurant. Other service offers determined by the travel platform to correspond to other various locations and times listed on the user's digital itinerary may be presented to the user at the appropriate time and when the user is within a predefined proximate area of the offering organization.

Users may find such targeted service offers highly appealing and may avail themselves of the service offers. This may cause users to place a high value on the services provided by the travel platform and ensure continued use of the platform by users. Moreover, verified interaction and acceptance of such targeted service offers may be used to validate and further train ML models used to generate the service offers.

In accordance with aspects, service offers/travel objectives may be sent to a user's mobile device in any suitable manner. The communication channel used by the collaboration service to send travel objective notifications may be based on a user's preference as indicated by settings configured by the user. The notifications may be in-band or out of band with respect to the collaboration service. Exemplary notification channels include in-application push notifications, SMS messages, MMS messages, email messages, etc.

In accordance with aspects, service offers may be presented to a user of the platform in a trackable way. For example, an offer may be presented to the user in the form of an advertisement including a trackable identifier, such as a bar code, a QR code, etc. In order to receive the good/service specified in the service offer, the user may have to present the service offer to the vendor/merchant for scanning or some other fashion of recordation. Thus, both the merchant and the platform provider can record data showing that the prediction that the offer was predicated on was accurate. This data can be used to further train the ML model, thereby enhancing the accuracy of the model's predictions. Additionally, the merchant can factor this data when purchasing further adds from the vendor.

Figure 5:
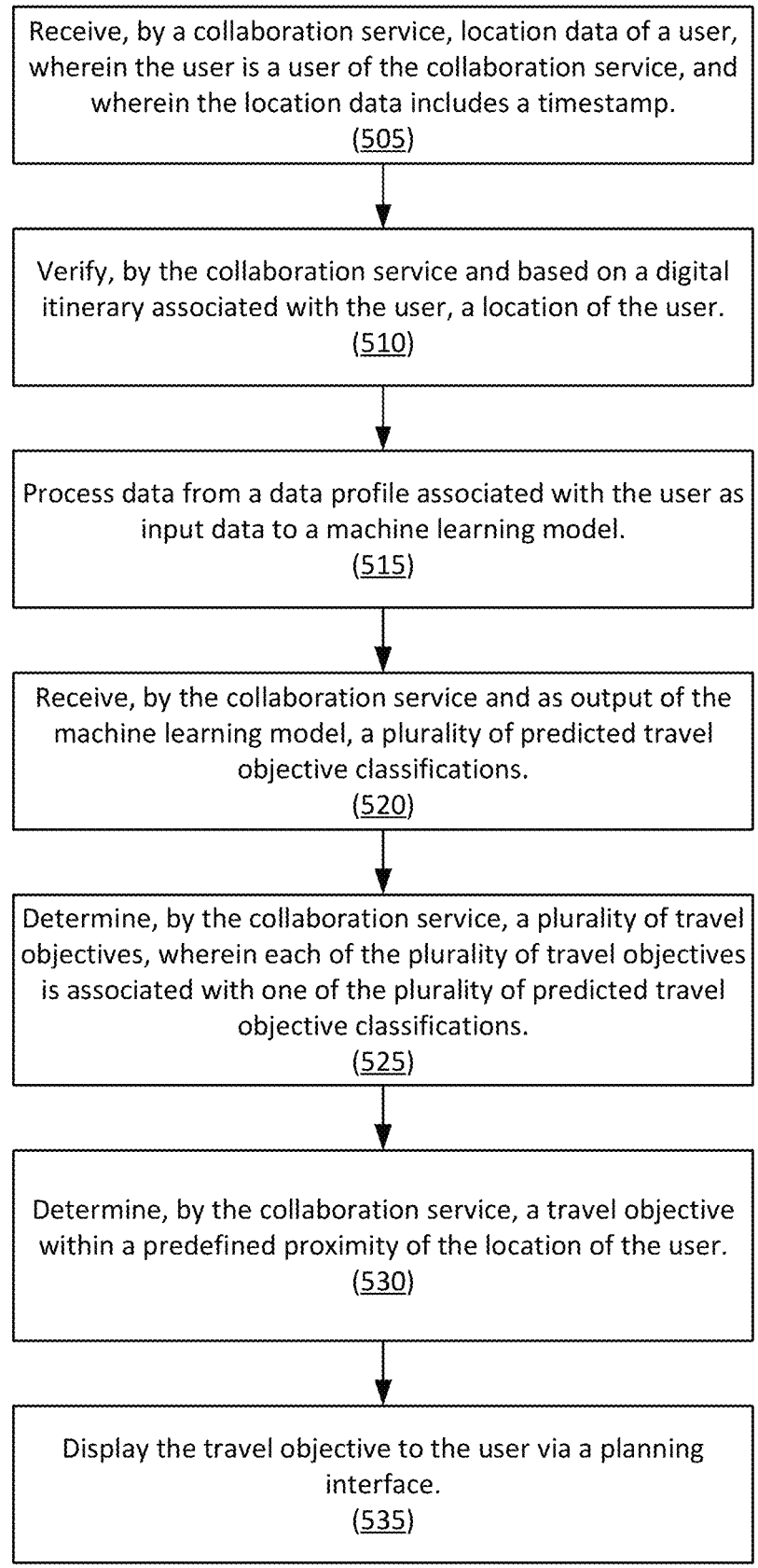
FIG. 5 is a logical flow for providing location-based travel objective notifications to a mobile device, in accordance with aspects.

FIG. 5 is a logical flow for providing location-based travel objective notifications to a mobile device, in accordance with aspects.

Step 505 includes receiving, by a collaboration service, location data of a user, wherein the user is a user of the collaboration service, and wherein the location data includes a timestamp.

Step 510 includes verifying, by the collaboration service and based on a digital itinerary associated with the user, a location of the user.

Step 515 includes processing data from a data profile associated with the user as input data to a machine learning model.

Step 520 includes receiving, by the collaboration service and as output of the machine learning model, a plurality of predicted travel objective classifications.

Step 525 includes determining, by the collaboration service, a plurality of travel objectives, wherein each of the plurality of travel objectives is associated with one of the plurality of predicted travel objective classifications.

Step 530 includes determining, by the collaboration service, a travel objective within a predefined proximity of the location of the user.

Step 535 includes displaying the travel objective to the user via a planning interface.

In accordance with aspects, the travel platform, based on the known data from the digital itinerary, may, at the end of the travel period or after an itinerary event or service is scheduled to take place, send the planning group users requests for reviews of the travel services listed on the itinerary and/or any travel objectives provided as ads or suggestions throughout the travel period. The review request may be in digital form and may be delivered electronically via a planning interface of the travel platform. Exemplary review questions may pertain to each group member's experience with each item on the itinerary (e.g., did the member like the locations/destinations, the accommodations, the airlines, the restaurants, the activities, etc.). Moreover, if a travel objective was provided as a location-based ad or suggestion, as described above, and the provided travel objective was verified as utilized by the user, the platform may request a review of the organization, service, etc., associated with the utilized travel objection suggestion.

In accordance with aspects, once feedback is provided, the platform can use comments and feedback as input to AI-ML models (e.g., content moderation/curation machine learning models) to generate scoring for itinerary line items and or travel objective offers. Feedback may also include images that can be scanned and provided as input to ML Deep Neural Networks models for facial expressions and/or items that could indicate potential preference for brands and object types. For instance, if a platform user is identified wearing one or more dresses in multiple images, and the manufacture of the dresses can be determined by comparing the image to merchant data sets, then dresses of those merchants can be marketed to the user. Alternatively dresses in general can be marketed.

Scoring may be order appropriate. That is, the platform may determine the overall quality of a provided review. For instance, the platform may determine whether verbiage provided in a review is positive or negative, whether the review is thorough or terse, etc. Tree/classification weighting may be applied to classifications such that classification of a review in one or more classes by the ML model may result in a score associated with the review that indicates that the review is relatively more (or less) valuable to the travel platform provider and/or partners of the travel platform provider.

For example, a review may be included as an input feature dataset to a curation content ML model. The model may have been trained on historical review content and may build trees that classify content in various classes. Classes may include sentiment classes (e.g., is the tone positive or negative, is there inappropriate or offensive language), length classes (e.g., is the review too long, too short, or an acceptably summarizing length), applicability (e.g., is the review applicable to the corresponding travel objective), etc.

The ML model and/or the collaboration space may be configured to assign a value score based on the combined weights of various classifications of a user-provided review. For example, a review may be passed through one or more ML models that classify the review with respect to sentiment, length, and applicability. The review may be classified into classes for each of the respective that have been heavily weighted. That is, the review may be classified as into a positive sentiment class, an acceptable length class, and a high applicability class. The platform may aggregate the class weights into a high relative value score—i.e., a score that indicates that the review will be very valuable to platform users and/or to partner providers of the service for which the review was written. Alternatively, if a modeled review is classified as into an inappropriate sentiment class, a too-long class, and an irrelevant class, then the platform may aggregate a low relative value score based on underweighting of these classes in the model configuration.

In accordance with aspects, the platform may further determine how the user will allow the review to be used. The platform may prompt the user, e.g., via a planning interface, for an indication, selection, etc., of how the user will allow the content to be used, with whom the platform provider may share the content, etc. Reward points (e.g., unified points) may be provided at different rates based on the allowable usage/sharing indicated by the user.

For example, if a user indicates that provided review content may be published/used only within the platform provider's organization, then the review will earn n number of reward points. Alternatively, if the user indicates that provided review content may be published/used within other affiliated channels (e.g., lodging channels airline channels, etc.), then the review will earn n points plus an additional number of points, or some other calculated or predetermined amount of points. If the user allows for resale of the review, another calculation or predetermined number of points may be earned by the review.

The travel platform may maintain a table for pricing reviews that a user indicates can be sold, and the table may reflect a review price that is correlated with a relative value score assigned to the review by the model/platform. For instance, a review with a high relative value score may be priced higher than a review with a medium or low relative value score. The platform may sell the scored reviews to any acceptable buyer.

Further, the quality of the review as determined by AI-ML processing of the platform, may be factored in the amount of reward points awarded for a given review. In this way, the platform provider may incentivize platform users to provide and make available reviews having high relative value scores. The collaboration service may maintain a table including relative value scores and corresponding unified point offerings. The table may further include a multiplier that corresponds with a usage selection. For instance, a if a user chooses to allow the platform to resell the review, then the unified points award may be multiplied by 2.0. If the user allows the partner provider to use the review, then the unified points award may be multiplied by 1.5. If the user only selects to allow the platform to use the review, then the unified point award may be multiplied by 1.0.

All reviews, scores, points, etc., provided to and generated by the platform with respect to travel objectives may be stored by the platform in a data store and in a profile of the providing user. In accordance with aspects, the review content may be further used to update the user's profile in order to enhance travel service and other offers made to the user, e.g., in the platform collaboration space, and in iterative and recursive training of the curation content ML model.

Figure 6:
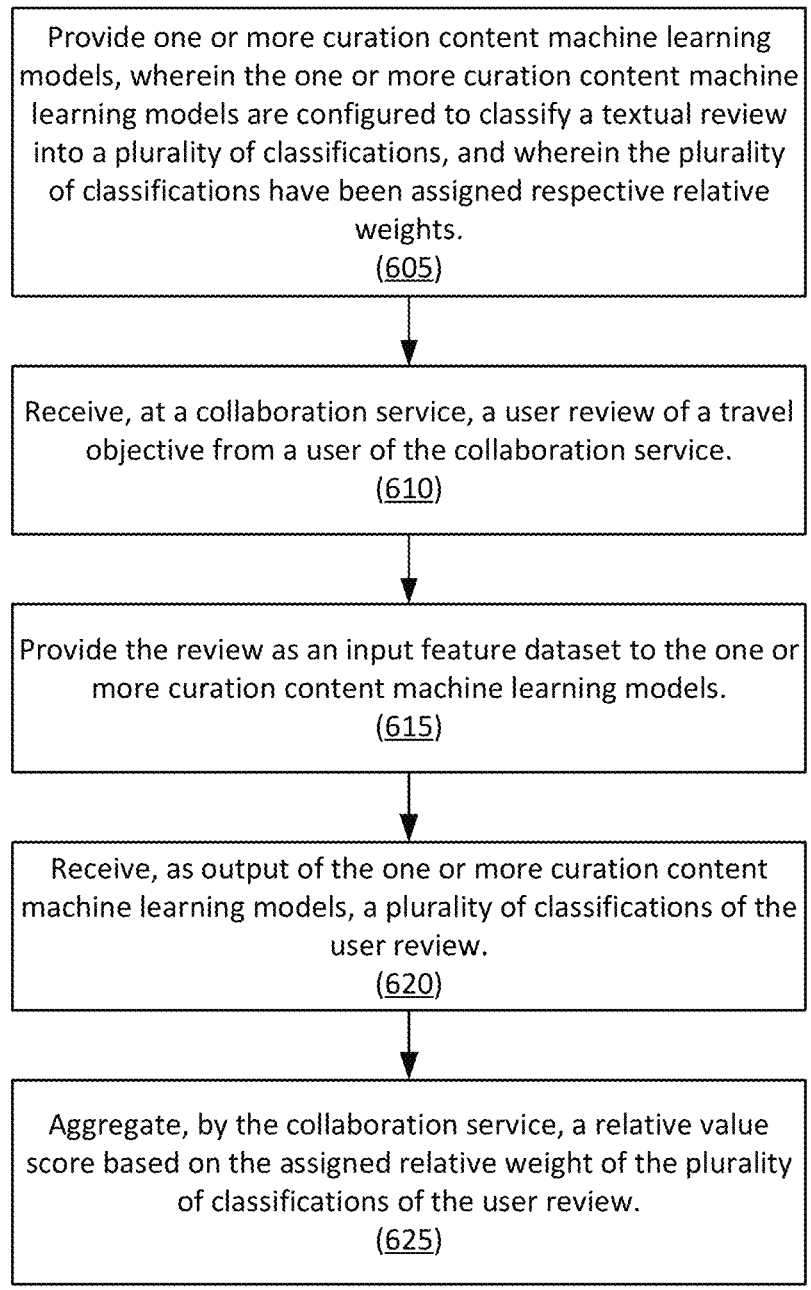
FIG. 6 is a logical flow for curated content classification, in accordance with aspects.

FIG. 6 is a logical flow for curated content classification, in accordance with aspects.

Step 605 includes providing one or more curation content machine learning models, where the one or more curation content machine learning models are configured to classify a textual review into a plurality of classifications, and where the plurality of classifications have been assigned respective relative weights.

Step 610 includes receiving, at a collaboration service, a user review of a travel objective from a user of the collaboration service.

Step 615 includes providing the review as an input feature dataset to the one or more curation content machine learning models.

Step 620 includes receiving, as output of the one or more curation content machine learning models, a plurality of classifications of the user review.

Step 625 includes aggregating, by the collaboration service, a relative value score based on the assigned relative weight of the plurality of classifications of the user review.

Figure 7:
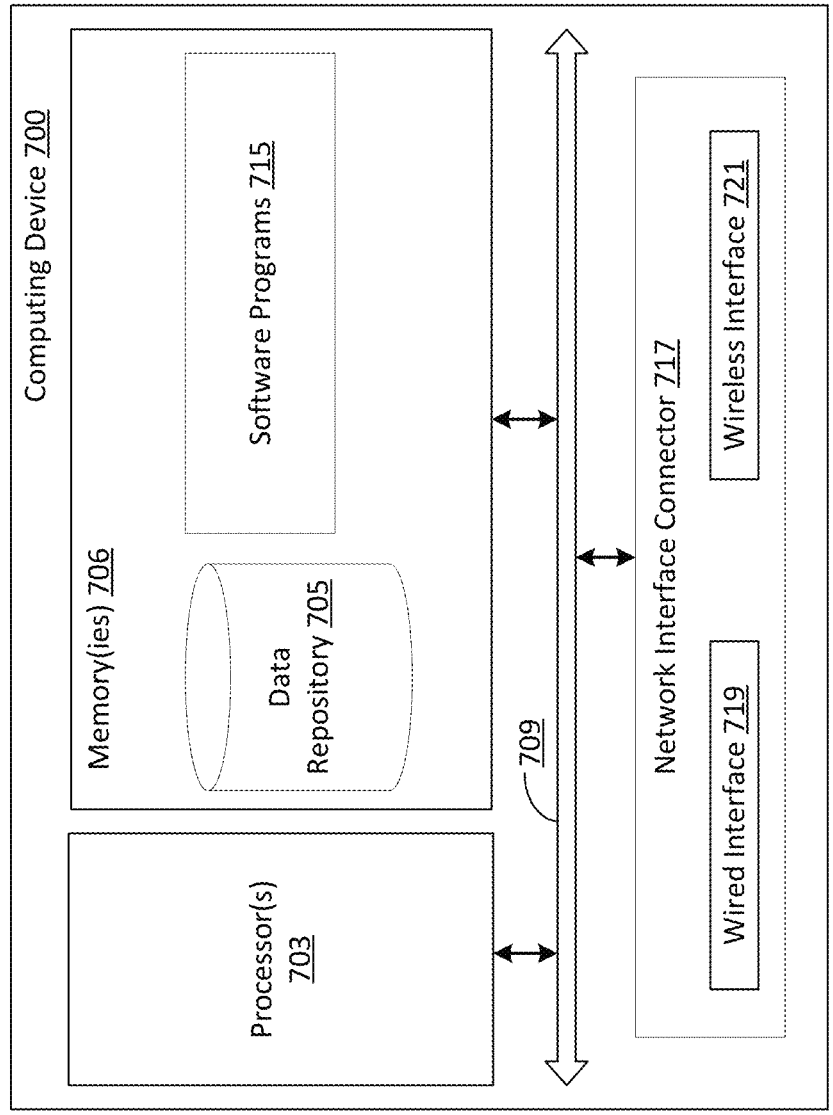
FIG. 7 is a block diagram of a computing device for implementing certain aspects of the present disclosure.

FIG. 7 is a block diagram of a computing device for implementing certain aspects of the present disclosure. FIG. 7 depicts exemplary computing device 700. Computing device 700 may represent hardware that executes the logic that drives the various system components described herein. For example, system components such as a collaboration server, a web interface, gateway servers, machine learning engines, point conversion engines, and database servers may include, and execute on, components and configurations like, or similar to, computing device 700. Computing device 700 includes a processor 703 coupled to a memory 706. Memory 706 may include volatile memory. The processor 703 executes computer-executable program code stored in memory 706, such as software programs 715. Software programs 715 may include one or more of the logical steps disclosed herein as a programmatic instruction, which can be executed by processor 703. Memory 706 may also include data repository 705, which may be nonvolatile memory for data persistence. The processor 703 and the memory 706 may be coupled by a bus 709. In some examples, the bus 709 may also be coupled to one or more network interface connectors 717, such as wired network interface 419, and/or wireless network interface 721. Computing device 700 may also have user interface components, such as a screen for displaying graphical user interfaces and receiving input from the user, a mouse, a keyboard and/or other input/output components (not shown).

The various processing steps and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a micro-processor and/or in the form of statically or dynamically programmed electronic circuitry.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method, comprising:
  receiving, by a collaboration service communicatively coupled to a user device, location data of a user, wherein the user is a user of the user device, and wherein the location data includes a timestamp;
  verifying, by the collaboration service and based on a digital itinerary associated with the user, a location of the user, wherein the location of the user is assigned a designation of definite information having a heaviest relative weighting, and wherein the digital itinerary includes a time field, and wherein the time field indicates a window of time that the user will be in a location;

processing, by a data processor communicatively coupled to the collaboration service and the machine learning model, data from a data profile associated with the user as input data to a machine learning model;

assigning, by the machine learning model, a designation of inferred information having a medium relative weighting to a location previously booked by the user based on the data profile associated with the user;

assigning, by the machine learning model, a designation of contextual information having a lowest relative weighting to a transaction by the user based on the data profile associated with the user;

receiving, by the collaboration service as output of the machine learning model, a plurality of predicted travel objective classifications;

determining, by the collaboration service, a plurality of travel objectives, wherein each of the plurality of travel objectives is associated with one of the plurality of predicted travel objective classifications;

determining, by the collaboration service, a travel objective of the plurality of travel objectives, the travel objective being within a predefined proximity of the location of the user and based on the relative weighting of the definite information, the inferred information, and the contextual information; and displaying, by the user device, the travel objective to the user via a planning interface, the travel objective being presented as a tracking identifier configured to allow access to an offer associated with the travel objective.

2. The method of claim 1, wherein the location data includes GPS coordinates.

3. The method of claim 1, wherein the digital itinerary the location is included in a field that is related to the time field.

4. The method of claim 1, comprising:
receiving, by the collaboration service, the tracking identifier from a service provider of the travel objective.

5. The method of claim 4, comprising:
including, based on receiving the tracking identifier, the travel objective in a user profile of the user with a related indication that the travel objective was utilized by the user.

6. A system comprising one or more computer processors, wherein the one or more computer processors are configured to:
receive, by a collaboration service communicatively coupled to a user device, location data of a user, wherein the user is a user of the user device, and wherein the location data includes a timestamp;

verify, by the collaboration service and based on a digital itinerary associated with the user, a location of the user, wherein the location of the user is assigned a designation of definite information having a heaviest relative weighting, and wherein the digital itinerary includes a time field, and wherein the time field indicates a window of time that the user will be in a location;

process, by a data processor communicatively coupled to the collaboration service and the machine learning model, data from a data profile associated with the user as input data to a machine learning model;

assign, by the machine learning model, a designation of inferred information having a medium relative weighting to a location previously booked by the user based on the data profile associated with the user;

assign, by the machine learning model, a designation of contextual information having a lowest relative weighting to a transaction by the user based on the data profile associated with the user;

receive, by the collaboration service as output of the machine learning model, a plurality of predicted travel objective classifications;

determine, by the collaboration service, a plurality of travel objectives, wherein each of the plurality of travel objectives is associated with one of the plurality of predicted travel objective classifications;

determine, by the collaboration service, a travel objective of the plurality of travel objectives, the travel objective being within a predefined proximity of the location of the user and based on the relative weighting of the definite information, the inferred information, and the contextual information; and display, by the user device, the travel objective to the user via a planning interface, the travel objective being presented as a tracking identifier, the tracking identifier including a machine-readable code configured to allow access to an offer associated with the travel objective.

7. The system of claim 6, wherein the location data includes GPS coordinates.

8. The system of claim 6, wherein the digital itinerary the location is included in a field that is related to the time field.

9. The system of claim 6, wherein the one or more computer processors are configured to receive, by the collaboration service, the tracking identifier from a service provider of the travel objective.

10. The system of claim 9, wherein the one or more computer processors are configured to include, based on receiving the tracking identifier, the travel objective in a user profile of the user with a related indication that the travel objective was utilized by the user.

11. A non-transitory computer readable storage medium, including instructions stored thereon, which instructions, when read and executed by one or more computer processors, cause the one or more computer processors to perform steps comprising:
receiving, by a collaboration service communicatively coupled to a user device, location data of a user, wherein the user is a user of the user device, and wherein the location data includes a timestamp;

verifying, by the collaboration service and based on a digital itinerary associated with the user, a location of the user, wherein the location of the user is assigned a designation of definite information having a heaviest relative weighting, and wherein the digital itinerary includes a time field, and wherein the time field indicates a window of time that the user will be in a location;

processing, by a data processor communicatively coupled to the collaboration service and the machine learning model, data from a data profile associated with the user as input data to a machine learning model;

assigning, by the machine learning model, a designation of inferred information having a medium relative weighting to a location previously booked by the user based on the data profile associated with the user;

assigning, by the machine learning model, a designation of contextual information having a lowest relative weighting to a transaction by the user based on the data profile associated with the user;

receiving, by the collaboration service as output of the machine learning model, a plurality of predicted travel objective classifications;

determining, by the collaboration service, a plurality of travel objectives, wherein each of the plurality of travel objectives is associated with one of the plurality of predicted travel objective classifications;

determining, by the collaboration service, a travel objective of the plurality of travel objectives, the travel objective being within a predefined proximity of the location of the user and based on the relative weighting of the definite information, the inferred information, and the contextual information; and displaying, by the user device, the travel objective to the user via a planning interface, the travel objective being presented as a tracking identifier, the tracking identifier including a machine-readable code configured to allow access to an offer associated with the travel objective.

12. The non-transitory computer readable storage medium of claim 11, wherein the location data includes GPS coordinates.

13. The non-transitory computer readable storage medium of claim 11, wherein the digital itinerary the location is included in a field that is related to the time field.

14. The non-transitory computer readable storage medium of claim 11, comprising:

receiving, by the collaboration service, the tracking identifier from a service provider of the travel objective; and including, based on receiving the tracking identifier, the travel objective in a user profile of the user with a related indication that the travel objective was utilized by the user.

* * * * *